United States Patent [19]

Greszczuk

[11] Patent Number: 4,931,250
[45] Date of Patent: Jun. 5, 1990

[54] MULTIMODE MODEM

[75] Inventor: John A. Greszczuk, Roslindale, Mass.

[73] Assignee: Codex Corporation, Canton, Mass.

[21] Appl. No.: 192,952

[22] Filed: May 12, 1988

[51] Int. Cl.⁵ .............................................. H04B 1/38
[52] U.S. Cl. ...................................... 375/8; 375/121; 379/63
[58] Field of Search ........................ 375/7, 8, 9, 13, 36, 375/39, 121; 379/93, 97, 98; 370/24, 31, 41, 43, 29, 110; 178/2 R, 3

[56] References Cited

U.S. PATENT DOCUMENTS

| 3,716,672 | 2/1973 | Fretwell | 375/8 |
| 3,842,207 | 10/1974 | Fretwell | 375/8 |
| 4,215,243 | 7/1980 | Maxwell | 379/98 |
| 4,578,796 | 3/1986 | Charalambous et al. | 375/8 |
| 4,727,370 | 2/1988 | Shih | 375/106 |
| 4,756,007 | 7/1988 | Qureshi et al. | 375/8 |

OTHER PUBLICATIONS

"A Proposed Appendix to Recommendation V. 32 Interworking Procedure with V. 22 BIS and V. 32 Modems", Study Group, XVII Geneva, 21–25, Apr. 1986.

Primary Examiner—Benedict V. Safourek
Attorney, Agent, or Firm—Fish & Richardson

[57] ABSTRACT

The modem communicates with a variety of modem types employing differing initial handshake signals. The multimode modem sends a sequence of signals corresponding to the variety of modem type handshake signals and the sequence terminates when the multimode modem receives an appropriate response identifying a particular one of the variety of modem types.

16 Claims, 4 Drawing Sheets

V.32 (call)

Multimode (answer)

V.22 (call)

Multimode (answer)

MULTIMODE MODEM

BACKGROUND OF THE INVENTION

This invention relates to multimode modems.

It is desirable for a modem to be able to interwork with V.32 and with V.22bis and V.22 modems on the public switched telephone network. It is also desirable that the modem automatically select the data rate and mode in which to operate. Further, any interworking procedure of the multimode modem should be compatible with various implementations of both standards.

An interworking procedure has been described which, for the multimode answer modem, involved sending the initial tone for the V.32 procedure (AC) and the initial tone for the V.22bis procedure (UNSCR1 to 1200 bps) simultaneously. See, "A Proposed Appendix to Recommendation V.32: Interworking Procedure With V.22bis and V.32 Modems", delayed contribution to D-30 to CCITT Study Group XVII, April 1986.

As described in this D-30 document, handshaking tones for both V.32 and V.22bis modulation modes are transmitted; because the total power is restricted, the tones for each modulation method are less powerful than the normal single-mode interworking. This power restriction poses a potential problem after a multimode modem has detected the modulation method of the other modem and needs to remove the other tones and increase the power of the correct signalling tones. A modem designed to V.22bis or V.32 and not to operation with a multimode procedure as described in the D-30 document might not operate properly through this transition. Further, a modem constructed to conform only to V.32, might not reject the additional tones used by a multimode modem to sense for a V.22bis modulation mode. As such, there is a possibility that a multimode modem built upon the algorithm described in the document D-30 might not operate with some implementation of V.32.

SUMMARY OF THE INVENTION

The multimode modem according to the invention for communicating with a variety of modem types employing differing initial handshake signals includes a multimode modem which sends a sequence of signals corresponding to the variety of modem type handshake signals, the sequence terminating when the multimode modem receives an appropriate response identifying a particular one of the variety of modem types. In a preferred embodiment, the multimode modem is adapted to interwork with V.32 and V.22bis and V.22 modems on the public switched telephone network.

The multimode modem of the invention utilizes a sequential technique to detect the modulation method of another modem with which to communicate. This technique defines an initial operating procedure in which the initial tones of the V.32 and then V.22bis standards are tried sequentially instead of simultaneously (or in parallel) as described in the D-30 document. The training procedure, after first seeing the initial tone, will meet the respective modem standards and thus will be much more robust to the method of implementation of the respective single mode modems. Furthermore, the sequential technique of the present invention may be more accurate than the parallel algorithm described in the D-30 document. This procedure can also be used after the initial connection to change the operating modes from the current mode to one of the other modes it is capable of supporting.

DESCRIPTION OF THE PREFERRED EMBODIMENT

The present invention is a modification of a single mode V.32 Model 2260 modem manufactured by the Codex Corporation of Canton, Mass. This modem includes a microprocessor chip, Model 6809 manufactured by the Motorola Corporation. The software driving this microprocessor was modified in the implementation of the preferred embodiment of the present invention.

The multimode modem of the invention incorporating both V.32 and V.22bis modes of operation can interwork at 9600 and 4800 bits per second with a V.32 modem and at 2400 and 1200 bits per second with a V.22bis modem and at 1200 bits per second with a V.22/212a modem, automatically selecting the correct mode.

Figure 1:
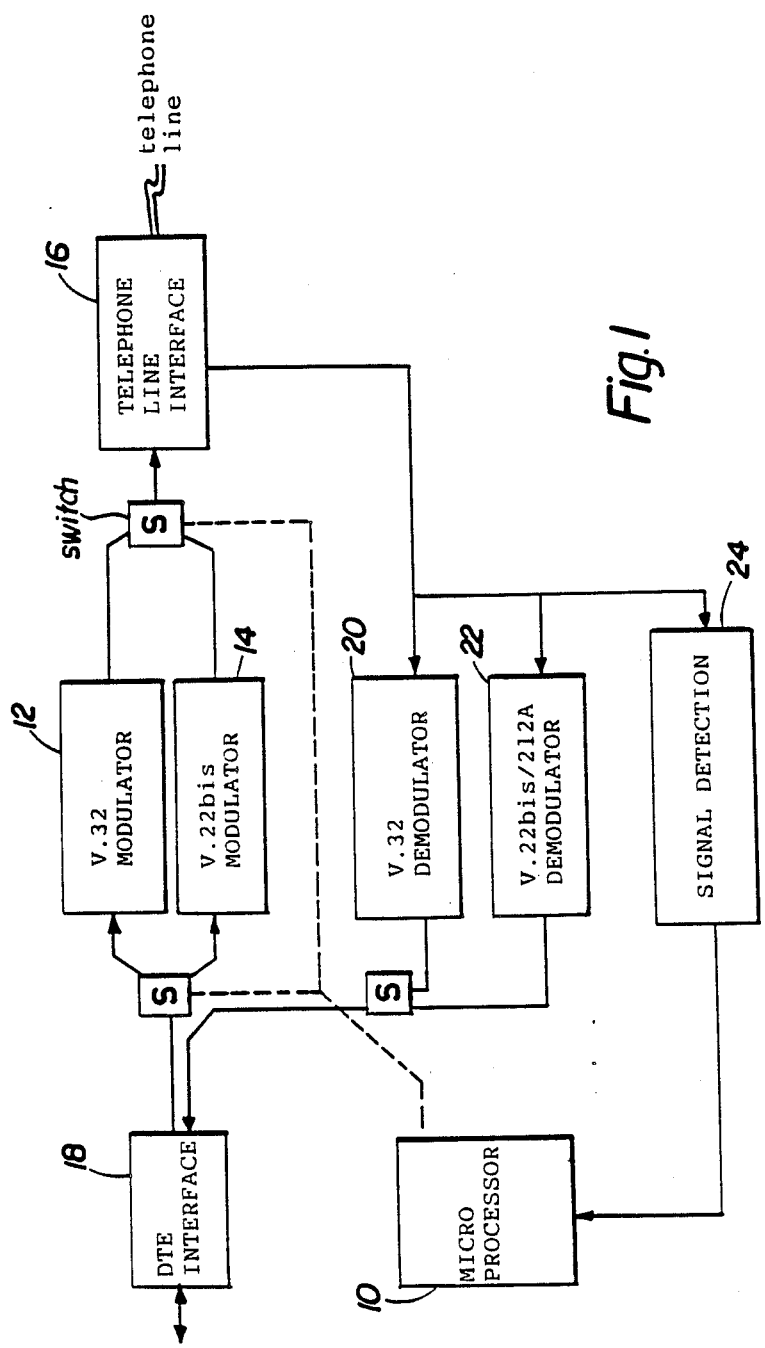
FIG. 1 is a block diagram of the multimode modem disclosed herein.
Figure 2:
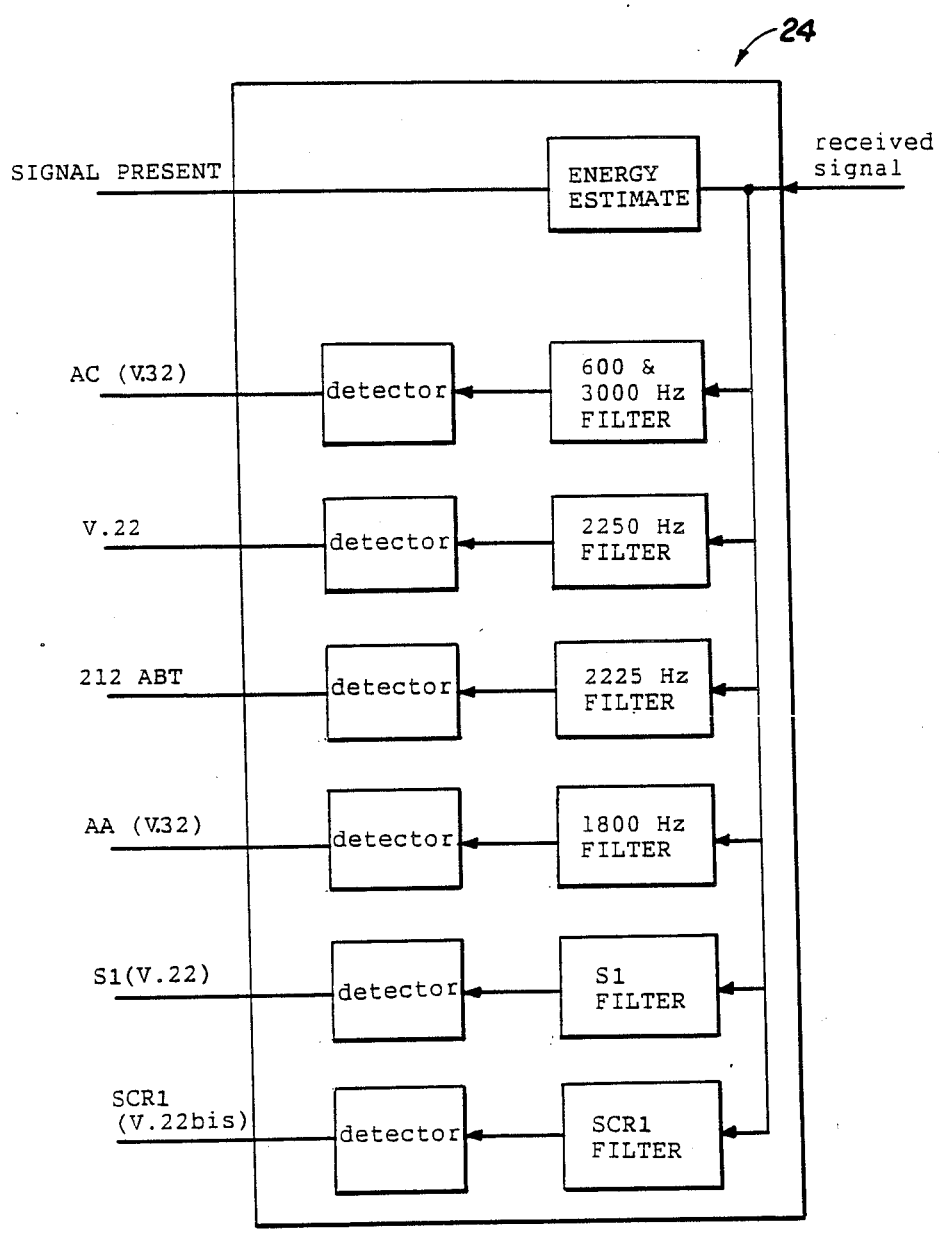
FIG. 2 is a block diagram of the signal detection block of FIG. 1.
Figure 3A:
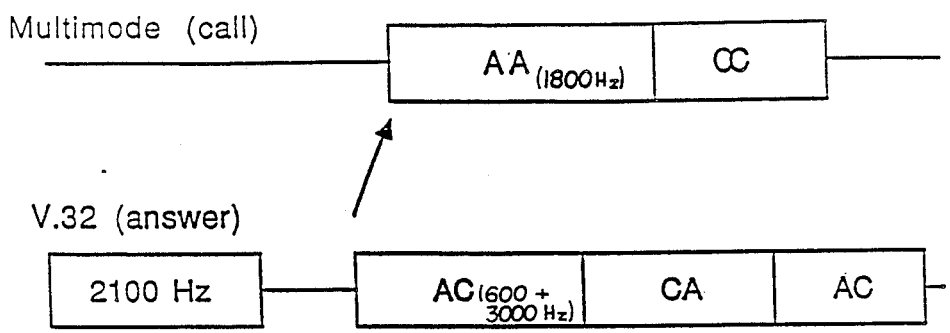
FIGS. 3a and 3b are schematic illustrations of a multimode call training sequence according to the invention.
Figure 3B:
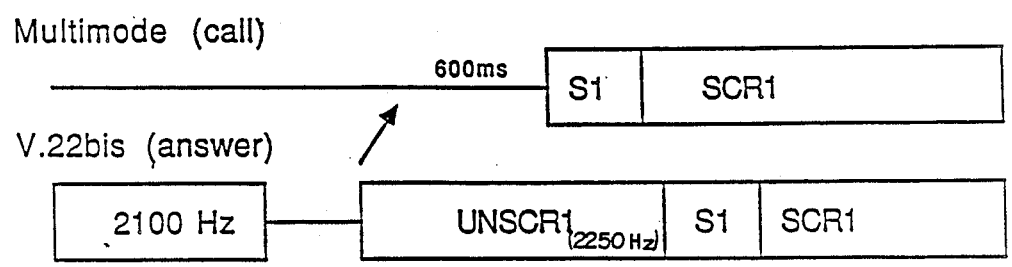

The multimode modem of the invention is shown in FIG. 1. A microprocessor 10 controls the functionality of the other blocks. The microprocessor 10 selects either a V.32 modulator 12 or a V.22bis modulator 14 to connect to a telephone lines interface 16 and to a DTE interface 18. The microprocessor 10 also selects which of demodulators 20 and 22 to use on the input signal and to connect to the DTE interface 18. The signal detection apparatus 24 provides information to the microprocessor 10 as to the type of signal being received. The apparatus 24 can determine if any of the following signals are present: 600 Hz and 3000 Hz tones (AC), an 1800 Hz tone (AA), a 2250 Hz tone, a 2225 Hz tone, a V.22bis modulated alternating sequence (S1), a V.22bis modulated scrambled 1's pattern (SCR1), or if no signal is present, as shown in FIG. 2. The microprocessor 10 selects the type of modulation to be used and the signal to be sent by the modem. As the calling modem it will not activate either modulator until it has determined the mode of operation to follow. The operation of a calling multimode modem will now be described in conjunction with FIGS. 3a and 3b. After connecting to a line the multimode modem will initially remain quiet. The multimode modem will be conditioned to detect one or two incoming tones at frequencies of 600 Hertz and 3,000 Hertz and an unscrambled ones V.22bis signal in the high channel (2250 Hertz). If 600 Hertz and/or 3,000 Hertz tones are received from an answering modem, the multimode modem will continue the handshake sequence in accordance with V.32 and commence transmission of a repetitive carrier state AA. If unscrambled ones at 1200 bits/second in the high band (as per V.22bis sections 2.1 and 2.4) is received from the answering modem, then the multimode modem will condition itself for operation in accordance with V.22bis, transmitting in the low band and receiving in the high band. The handshake sequence will be completed in accordance with V.22bis (section 6.3.1.1.1 or 6.3.1.2.1).

Figure 4A:
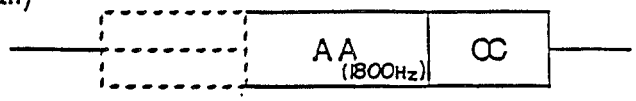
FIGS. 4a and 4b illustrate multimode answer training sequences.
Figure 4A:
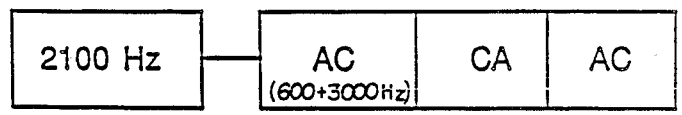
Figure 4B:
Figure 4B:
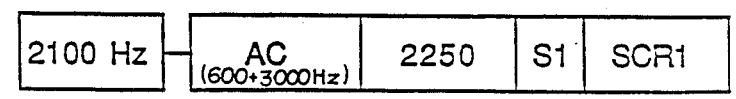

As the answer modem, the V.32 initial training sequence is sent first and if there has been no response after a time period, the V.22bis initial training sequence is sent. Since the V.32 signal is the first one sent, two multimode modems will interwork in the V.32 mode, which is the highest, and hence the most desirable rate. The operation of an answering multimode modem will not be discussed in conjunction with FIGS. 4a and 4b. After connecting to the line, the multimode modem will transmit the recommendation V.25 answer sequence (2100 Hz). Then the modem will transmit alternate carrier states A and C. The multimode modem will be conditioned to detect an incoming tone at 1800 Hertz If the 1800 Hertz tone is received from the calling modem, then the multimode modem will continue the training sequence in accordance with V.22 section 5.4.2. If there has been no signal received after a period of five seconds, then the multimode modem will cease transmitting AC and start to transmit a tone at 2250 Hertz. The multimode modem will be conditioned to detect a V.22bis signal in the low channel as well as a tone at 1800 Hertz. If a low channel signal is received from the calling modem, then the multimode modem will condition itself to receive in the low channel and transmit in the high channel and continue the handshake sequence in accordance with V.22bis (section 6.3.1.1.2 or 6.3.1.2.2). If a tone at 1800 Hertz is received, than the multimode modem will cease transmitting the 2250 Hertz tone and start transmitting alternating carrier states A and C, the multimode modem will attempt to follow the remainder of the V.32 training sequence.

What is claimed is:

1. A multimode modem for communicating with a variety of modem types employing different initial handshake signals, comprising:
   circuitry for sending a sequence of signals corresponding to the variety of modem type handshake signals and for transmitting the sequence when the multimode modem receives a response that identifies a particular one of the variety of modem types; and
   circuitry for determining the particular type of modem from the received response, said determining being made simultaneously for at least two of said modem types.

2. The multimode modem of claim 1 wherein the variety of modem types include V.32 and V.22bis.

3. The multimode modem of claim 2 where a handshake signal for the V.32 modem type is the first one transmitted.

4. The multimode modem of claim 1 further adapted to cause the sequence of handshake signals to be sent at a predetermined time after said connection is made so that the operating mode of said multimode modem can be changed.

5. The multimode modem of claim 1 wherein said multimode modem is a calling modem and said response that identifies a particular modem type is received from an answering modem, and further comprising
   circuitry for causing said multimode modem to establish a connection with said answering modem, and to operate in a mode that corresponds to said particular type of said answering modem.

6. The multimode modem of claim 1 wherein said circuitry for determining determines said particular type of modem simultaneously for all of said modem types.

7. The multimode modem of claim 1 wherein said circuitry for determining determines said particular type of modem simultaneously with said sending of said sequence and receiving said response.

8. The multimode modem of claim 1 wherein said circuitry for determining comprises at least two filters, which correspond to said at least two modem types, that are adapted to simultaneously receive said response, said filters producing output signals that indicate said particular type of modem.

9. A method for operating a multimode modem of the kind that communicates with a variety of modem types employing different initial handshake signals, comprising:
   sending a sequence of signals corresponding to the variety of modem type handshake signals and terminating the sequence when the multimode modem receives a response that identifies a particular one of the variety of modem types; and
   determining, simultaneously for at least two of said modem types, the particular type of modem from the received response.

10. The method of claim 9 wherein the variety of modem types include V.32 and V.22bis.

11. The method of claim 10 further comprising transmitting a handshake signal for the V.32 modem type before transmitting a handshake signal for the V.22bis modem type.

12. The method of claim 9 wherein said multimode modem is a calling modem and said response that identifies a particular modem type is received from an answering modem, and further comprising
   causing said multimode modem to establish a connection with said answering modem, and to operate in a mode that corresponds to said particular type of said answering modem.

13. The method of claim 12 further comprising
   causing the sequence of handshake signals to be sent at a predetermined time after said connection is made so that the operating mode of said multimode modem can be changed.

14. The method of claim 9 wherein said determining is made simultaneously for all of said modem types.

15. The method of claim 9 wherein said determining is made simultaneously with said sending of said sequence and receiving said response.

16. The method of claim 9 wherein said determining comprises simultaneously applying said response to at least two filters, which correspond to said at least two modem types, said filters producing output signals that indicate said particular type of modem.

* * * * *

UNITED STATES PATENT AND TRADEMARK OFFICE
CERTIFICATE OF CORRECTION

PATENT NO. : 4,931,250

DATED : June 5, 1990

INVENTOR(S) : John A. Greszczuk

It is certified that error appears in the above-identified patent and that said Letters Patent is hereby corrected as shown below:

| | |
|---|---|
| Col. 2, line 36 | "lines" should be --line--. |
| Col. 3, line 11 | "not" should be --now--. |
| Col. 3, line 16 | "1800 Hertz If" should be --1800 Hertz. If--. |
| Col. 3, line 31 | "than the" should be --then the-- |

UNITED STATES PATENT AND TRADEMARK OFFICE
CERTIFICATE OF CORRECTION

PATENT NO. : 4,931,250

DATED : June 5, 1990

INVENTOR(S) : John A. Greszczuk

It is certified that error appears in the above-identified patent and that said Letters Patent is hereby corrected as shown below:

Col. 3, line 42    "for transmitting the" should be
    --for terminating the--.

Signed and Sealed this

Seventeenth Day of December, 1991

Attest:

HARRY F. MANBECK, JR.

*Attesting Officer*    *Commissioner of Patents and Trademarks*